United States Patent
Ohashi et al.

(10) Patent No.: US 7,535,162 B2
(45) Date of Patent: May 19, 2009

(54) ZINC OXIDE PHOSPHOR, PROCESS FOR PRODUCING THE SAME AND LIGHT EMITTING DEVICE

(75) Inventors: Naoki Ohashi, Ibaraki (JP); Takamasa Ishigaki, Ibaraki (JP); Hiroyuki Taguchi, Ibaraki (JP); Isao Sakaguchi, Ibaraki (JP); Hajime Haneda, Ibaraki (JP); Takashi Sekiguchi, Ibaraki (JP)

(73) Assignee: National Institute for Materials Science, Tsukuba-shi (JP)

( * ) Notice: Subject to any disclaimer, the term of this patent is extended or adjusted under 35 U.S.C. 154(b) by 0 days.

(21) Appl. No.: 10/554,724

(22) PCT Filed: Apr. 30, 2004

(86) PCT No.: PCT/JP2004/006402

§ 371 (c)(1),
(2), (4) Date: Jan. 23, 2007

(87) PCT Pub. No.: WO2004/096949

PCT Pub. Date: Nov. 11, 2004

(65) Prior Publication Data

US 2007/0158615 A1    Jul. 12, 2007

(30) Foreign Application Priority Data

Apr. 30, 2003    (JP) .............................. 2003-124743

(51) Int. Cl.
 *H01J 1/62* (2006.01)
(52) U.S. Cl. ................. 313/503; 313/486; 252/301.6 R
(58) Field of Classification Search ................. 313/503; 252/301.6 R, 301.4 P
See application file for complete search history.

(56) References Cited

U.S. PATENT DOCUMENTS 3,583,928 A  *  6/1971  Lehmann ............... 252/301.6 R
6,896,731 B1 *  5/2005  Yamamoto et al. ........ 117/108
6,985,275 B2 *  1/2006  Miyazawa .................. 313/503

(Continued)

FOREIGN PATENT DOCUMENTS

JP        01168789  A  *  7/1989

(Continued)

OTHER PUBLICATIONS

Naoki Ebisa Wa et al., "Luminescence properties of ZnO co-doped with Al and Li", The Ceramic Society of Japan Nenkai Koen Yokoshu, vol. 2002, p. 170, Mar. 24, 2002.

(Continued)

*Primary Examiner*—Peter J. Macchiarolo
*Assistant Examiner*—Donald L Raleigh
(74) *Attorney, Agent, or Firm*—Westerman, Hattori, Daniels & Adrian, LLP.

(57) ABSTRACT

The present invention relates to a zinc oxide phosphor characterized by emitting visible light with a broad emission spectrum close to white, and a process for producing the same. A powder prepared by adding a plurality of additives to zinc oxide and heat-treating the resulting mixture is further hydrogenated to improve the luminous efficiency of the zinc oxide phosphor. The zinc oxide phosphor providing a broad emission spectrum covering a wavelength range over substantially the entire visible region can be applied to a white diode, a white vacuum fluorescent display, and a fluorescent paint.

11 Claims, 7 Drawing Sheets

12 Zinc Oxide Phosphor
13 Glass Substrate
14 Fluorescent Tube

U.S. PATENT DOCUMENTS

| | | | |
|---|---|---|---|
| 2003/0012984 A1* | 1/2003 | Ueda | 428/698 |
| 2003/0052980 A1* | 3/2003 | Brown et al. | 348/266 |
| 2004/0113131 A1* | 6/2004 | Hamada et al. | 252/582 |
| 2004/0196258 A1* | 10/2004 | Fujioka et al. | 345/157 |

FOREIGN PATENT DOCUMENTS

| | | | |
|---|---|---|---|
| JP | 6-70190 | | 3/1994 |
| JP | 6-93259 | | 4/1994 |
| JP | 8-236275 | | 9/1996 |
| JP | 10-3990 | | 1/1998 |
| JP | 10-245550 | | 9/1998 |
| JP | 10245550 A | * | 9/1998 |
| JP | WO/01/012884 | * | 2/2001 |
| JP | 2003-51609 | | 2/2003 |
| JP | 2003-231878 | | 8/2003 |
| JP | 2003231878 A | * | 8/2003 |

OTHER PUBLICATIONS

Naoki Ohashi et al., "Electric and Light Emitting Properties of Co-doped Zinc Oxide", Extended Abstracts, The Japan Society of Applied Physics, vol. 63, No. 1, p. 265, Sep. 24, 2002.

Tetsushi Tamura et al., "Illumination characteristics of lighting array using 10 candela-class white LEDs under AC 100 V operation", Journal of Luminescence 87-89 pp. 1180-1182 (2000).

* cited by examiner

ZINC OXIDE PHOSPHOR, PROCESS FOR PRODUCING THE SAME AND LIGHT EMITTING DEVICE

TECHNICAL FIELD

The present invention relates to a zinc oxide phosphor characterized by providing a broad visible emission spectrum and being used for a fluorescent paint or a light emitting device using zinc oxide which is relatively inexpensive and can be stably obtained as resources. The present invention also relates to a process for producing the zinc oxide phosphor and a light emitting device using the same.

BACKGROUND ART

Control of the characteristics of zinc oxide is realized by addition of additives and heat treatment. The Kroger-Vink notation of defects describes that electric conductivity is imparted by formation of defects according the following equations 1 and 2:

$$ZnO \rightarrow Zn_{Zn}^x + V_o^{\bullet} + e' + (1/2)O_2 \uparrow \qquad \text{Equation 1}$$

$$2ZnO \rightarrow Zn_{Zn}^x + Z_{ni}^{\bullet} + V_o^{\bullet} + e' + (1/2)O_2 \uparrow \qquad \text{Equation 2}$$

It has been thought that the defects induced as described above participate in luminescence of zinc oxide, and blue-green light emitting zinc oxide phosphors which have been developed and put into practical applications are regarded as including zinc oxide which contains defects synthesized by chemical reaction according to equation 1 or 2, i.e., a composition represented by the chemical formula $Zn_{1+x}O$ or $ZnO_{1-x}$. For example, as disclosed in Patent Document 1, such a phosphor is produced by heat-treating an inorganic raw material containing zinc in a low oxygen-partial-pressure atmosphere.

Control of the characteristics of zinc oxide by addition of impurities is realized by adding any one of III group elements, such as aluminum, indium, and gallium, or an alkali metal element, such as sodium or lithium. The addition of additives is expressed by equations 3 and 4. Equation 3 indicates that electric conductivity is imparted by adding a III group element shown by X, and equation 4 indicates that electric conductivity is controlled by adding an alkali metal element shown by Z.

$$ZnO + X_2O_3 \rightarrow Zn_{Zn}^x + 2X_{Zn}^{\bullet} + 3O_o^x + e' + (1/2)O_2 \uparrow \qquad \text{Equation 3}$$

$$ZnO + Z_2O + (1/2)O_2 + e' \rightarrow Zn_{Zn}^x + 2Z_{Zn}' + 3O_o^x \qquad \text{Equation 4}$$

The effect of an additive on ZnO has been conventionally achieved by a general technique of introducing donors or acceptors, and basically, a green-light emitting zinc oxide-based composition has been realized by a composition represented by $Zn_{1+x}O$ or $ZnO_{1-x}$, i.e., zinc oxide containing introduced donors.

However, in the present invention, the luminescence characteristics of zinc oxide are controlled by simultaneously adding a III group element which creates a donor level and an alkali metal element which creates an acceptor level in zinc oxide. Therefore, the present invention is different from the conventional technique.

A yellow-light emitting zinc oxide paint is disclosed in Patent Document 2. The invention described in Patent Document 2 discloses a paint composition which appears in yellow when illuminated with sunlight or white light representative of general illumination light, and a process for producing the paint. Namely, the invention of Patent Document 2 relates to a zinc oxide-based composition producing a yellow reflection spectrum. However, Patent Document 2 does not disclose luminescence from the yellow paint under illumination with particle rays or electromagnetic waves, and is thus different from the present invention in object and advantage. The yellowish luminescence cannot be achieved by the technique disclosed in Patent Document 2.

An example of a yellowish-light emitting phosphor is yttrium-aluminum garnet containing cerium. This phosphor is used as a scintillator material. For example, Nonpatent Document 1 shows the luminescence state of this phosphor. In recent years, the phosphor has been used for producing a white-light emitting semiconductor device by combination with a nitride semiconductor LED.

Apart from the green luminescence of $Zn_{1+x}O$ or $ZnO_{1-x}$ described above, there is also a process of producing visible luminescence using an additive. In this process, visible luminescence is activated by adding a lanthanide element. Patent Document 3 discloses a visible-light emitting composition. A zinc oxide-based composition of the invention of Patent Document 3 emits visible light using the emission line of a lanthanide element and is characterized by emitting light only at a specified wavelength. Therefore, this process is not a process for producing a zinc oxide-based composition giving a continuous emission spectrum with a broad luminescence band, which is representative of a so-called incandescent lamp. Therefore, the object of the present invention and the advantages achieved thereby cannot be achieved by the technique disclosed in Patent Document 3.

Patent Document 1 Japanese Unexamined Patent Application Publication No. 06-093259

Patent Document 2 Japanese Examined Patent Application Publication No. 06-070190

Patent Document 3 Japanese Unexamined Patent Application Publication No. 08-236275

Nonpatent Document 1 T. Tamura, T. Setomoto, and T. Taguchi, Journal of Luminescence, Vol. 87-89, P. 1180 (2000)

DISCLOSURE OF INVENTION (Problem to be Solved by the Invention)

The luminescence of a zinc oxide-based composition which is taken into consideration in the present invention has been studied in physics. As described in, for example, Schermel and Twingel, Solid State Communication, Vol. 8, P. 1559, 1970, yellow luminescence is obtained by a zinc oxide-based composition at a very low temperature.

However, an effective industrial process for producing such a zinc oxide-based composition and a chemical composition for controlling the luminous efficiency thereof have been not disclosed so far, and a production process and a chemical composition for industrial application as a material have been not known yet. Furthermore, industrial development of yellowish luminescence, which is achieved by realizing a broad emission spectrum, has been not achieved yet.

An object of the present invention is to realize a zinc oxide phosphor characterized in that when ultraviolet rays or electromagnetic waves or electron rays at a shorter wavelength than that of ultraviolet rays, which have energy exceeding the band gap of the composition described above, are applied to excite electrons and holes in ZnO, the maximum intensity of an emission spectrum at room temperature is observed in a wavelength range of 550 nm to 650 nm, and the emission spectrum is a continuous spectrum extending to a wavelength of 400 nm or less at the short-wavelength tail and to a long wavelength of 800 nm or more at the long-wavelength tail.

Namely, the object is to introduce an effective energy level for realizing the above-mentioned luminescence in a zinc oxide-based composition.

When a light-emitting function is imparted to zinc oxide, defects for electric charge compensation are formed by heat treatment or addition of additives. The defects and additives have two influences on the luminescence of zinc oxide. One of the influences is luminescence due to the defects and the additives, and the electric transition for luminescence is referred to as "radiative transition". The other influence is a process in which electron-hole pairs excited in zinc oxide dissipate energy as heat without emitting light. This electric transition is referred to as "non-radiative transition".

In order to improve the function of a phosphor, it is necessary to inactivate defects contributing to useful radiative transition, for increasing the probability of recombination of excited electron-hole pairs due to useful radiative transition. Namely, a problem to be solved by the present invention is to increase luminous efficiency by decreasing the probability of non-radiative transition.

(Means for Solving the Problem)

Pure zinc oxide is a semiconductor having a band gap of about 3.3 eV, and pure zinc oxide emits ultraviolet light at about 380 nm. Also, when defects are introduced, blue-green light is emitted with an intensity peak at about 520 nm. In order to emit light from zinc oxide having these characteristics, a level for creating radiative transition must be further introduced in the band gap.

By general heat treatment in an oxidizing or reducing atmosphere, only defects for the green luminescence described above are introduced. Therefore, other defects must be introduced by adding some additive. It is also necessary that the introduced defects have a proper energy state for yellowish visible luminescence, not blue or green light, under excitation with particle rays or electromagnetic waves having energy exceeding at least the band gap.

As a result of studies for realizing luminescence due to donor-acceptor pairs, i.e., luminescence due to combination of donor electrons and acceptor holes, the inventors of the present invention have found a zinc oxide phosphor characterized in that the phosphor is composed of zinc oxide containing a total of two or more additives including at least one of aluminum, gallium, and indium and at least one of lithium and sodium, and when the phosphor is excited with ultraviolet rays or electromagnetic waves or electron rays at a shorter wavelength than that of ultraviolet rays, the maximum intensity of an emission spectrum at room temperature is observed in a wavelength range of 550 to 650 nm, and the spectrum is a continuous spectrum extending to 400 nm or less at the short-wavelength tail and to 800 nm or more at the long-wavelength tail.

In particular, the zinc oxide phosphor is characterized by emitting yellowish white light at room temperature, the emitted light being a yellowish color corresponding to a range in which x=0.40 to 0.47 and y=0.44 to 0.47 in the CIE1964 color specification system.

The broadening of the coordinate values in the color specification system means that the luminescence of the phosphor of the present invention has an afterglow property, and the occurrence of luminescence varies depending on the excitation method or conditions, i.e., whether excitation is continuous or pulsative, whether or not the excitation method causes significant afterglow, and the like.

In order to improve the usefulness of the phosphor, the probability of non-radiative transition described above must be decreased. A method for decreasing the probability of non-radiative transition is disclosed in, for example, Japanese Unexamined Patent Application Publication No. 10-245550. However, this method is aimed at achieving a high efficiency in ultraviolet luminescence by inactivating not only non-radiative transition but also radiative transition in which detects participate.

However, in the present invention, only the defects and impurities contributing to useful visible luminescence in the zinc oxide phosphor are activated by controlling the concentration of the hydrogen introduced in the zinc oxide phosphor, and visible luminescence contributing to non-radiative transition is inactivated, thereby improving the function of the phosphor.

As the zinc oxide phosphor in which the probability of non-radiative transition is decreased, a zinc oxide phosphor characterized by visible luminescence can be used, the zinc oxide phosphor including a surface layer containing solid-dissolved hydrogen at a hydrogen concentration controlled so as to inactive the defects formed in the phosphor to contribute to non-radiative transition and not to inactive the defects contributing to radiative transition. Alternatively, the zinc oxide phosphor containing hydrogen at a concentration controlled so as to inactive the defects formed in the phosphor to contribute to non-radiative transition over the entire region of a crystal grain and not to inactivate the defects contributing to radiative transition.

Herein, a hydrogenation method is not particularly limited, and any method can be used as long as hydrogen can be introduced in zinc oxide. However, a method of introducing hydrogen by treatment in a high-temperature hydrogen gas may cause sublimation of zinc oxide and a deviation in the additive composition due to the hydrogen gas atmosphere at a low oxygen partial pressure. Therefore, it is effective to introduce hydrogen by exposing the phosphor to activated hydrogen, such as hydrogen plasma or hydrogen radical, and a plasma generator can be used. Such a plasma generator is publicly known (for example, Japanese Patent Publication No. 2920207).

Another object of the present invention is to provide an apparatus for exciting a zinc oxide phosphor to emit light therefrom. Namely, the object is to emit light from the zinc oxide phosphor of the present invention using electromagnetic waves or electron rays with energy higher than the band gap energy of zinc oxide.

The apparatus for emitting visible light from the zinc oxide phosphor can be provided by a method (1) in which luminescence is excited by irradiating the zinc oxide phosphor with electromagnetic waves at a wavelength of 375 nm or less, or a method (2) in which the luminescence of the phosphor is excited by irradiating the phosphor with electron rays.

Furthermore, a display panel for displaying information or images can be produced by arraying a plurality of the visible-light emitting apparatuses in a desired pattern.

BEST MODE FOR CARRYING OUT THE INVENTION (1) Composition and Luminescence of Zinc Oxide Phosphor A zinc oxide phosphor which is targeted in the present invention is characterized in that yellowish luminescence is visually observed when the phosphor is excited with particle rays or electromagnetic waves having energy higher than the band gap energy of the composition described above. Namely, the zinc oxide phosphor is characterized in that the maximum intensity of an emission spectrum at room temperature is observed in a wavelength range of 550 nm to 650 nm, and the emission spectrum is a continuous spectrum extending to 400 nm or less at the short-wavelength tail and to 800 nm or more at the long-wavelength tail. Regardless of the production method, the zinc oxide phosphor has a zinc oxide-based composition characterized by being composed of zinc oxide as a main component and containing a total of two or more additives including at least one of aluminum, gallium, and indium, and at least one of lithium and sodium.

The zinc oxide phosphor which is targeted in the present invention has the zinc oxide-based composition characterized in that in order to further increase the luminous efficiency, a surface layer containing solid-dissolved hydrogen is formed at a hydrogen concentration controlled so as to inactive the defects formed in the phosphor to contribute to non-radiative transition and not to inactivate the defects contributing to radiative transition, or hydrogen is contained at a concentration controlled so as to inactive the defects formed in the phosphor to contribute to non-radiative transition over the entire region of a grain and not to inactivate the defects contributing to radiative transition.

The zinc oxide-based composition of the intended zinc oxide phosphor of the present invention is characterized in that the observed emitted light has a yellowish color corresponding to a range in which x=0.40 to 0.47 and y=0.44 to 0.47 in the CIE1964 color specification system.

Furthermore, the zinc oxide-based composition of the intended zinc oxide phosphor of the present invention is characterized in that the observed emitted light has a yellowish color corresponding to a range in which x=0.40 to 0.47 and y=0.44 to 0.47 in the CIE1964 color specification system, and in that in order to further increase the luminous efficiency, a surface layer containing solid-dissolved hydrogen is formed at a hydrogen concentration controlled so as to in active the defects formed in the phosphor to contribute to non-radiative transition and not to inactivate the defects contributing to radiative transition, or hydrogen is contained at a concentration controlled so as to inactive the defects formed in the phosphor to contribute to non-radiative transition over the entire region of a grain, and not to inactivate the defects contributing to radiative transition.

The composition of zinc oxide used for producing the zinc oxide phosphor of the present invention contains a total of two or more additives including at least one of inorganic salts or oxides of aluminum, gallium, and indium, and at least one of inorganic salts or oxides of lithium and sodium.

The additive concentrations in zinc oxide are determined by the solid solution limits of the additives. On the other hand, the solid solution limits of the additives in zinc oxide vary with the environment in which the zinc oxide phosphor is used, i.e., the heat treatment temperature and oxygen partial pressure for producing a solid solution.

The maximum amounts of the impurities added for controlling the luminescence wavelength are determined by the solid solution limits thereof. Since the solid solution limit depends on the temperature and oxygen partial pressure for synthesizing a material, the solid solution limit cannot be determined unconditionally. However, the maximum concentration of aluminum, indium, or gallium is about 3000 ppm, and the maximum concentration of sodium or lithium is about 1000 ppm. With respect to the minimum limit for achieving a certain degree of luminous efficiency, the minimum limit of aluminum, gallium, or indium is properly 500 ppm or more, and the minimum limit of lithium or sodium is properly 100 ppm or more. These impurities become origins of luminescence, and thus light mission increases as the impurity concentrations increase. However, in the method for emitting light by electron ray irradiation, the amount of lithium or sodium added must be controlled in consideration of the fact that when the electric resistance is excessively increased, the luminous efficiency decreases.

When heat is applied in a process for producing a solid solution, lithium or sodium characterized by being highly volatile may be lost by evaporation without being solid-dissolved in the phosphor. Therefore, in producing the solid solution, the initial composition for producing the solid solution may be determined in consideration of the heat treatment temperature and atmosphere for producing the solid solution and the evaporation of a raw material in the process for producing the solid solution.

In the present invention, in order to obtain the zinc oxide phosphor characterized in that the maximum intensity of the luminescence spectrum is observed in a wavelength range of 550 nm to 650 nm, and the spectrum is a continuous spectrum extending to 400 nm or less at the short-wavelength tail and to 800 nm or more at the long-wavelength tail, it is effective to prepare zinc oxide containing a total of two or more additives including at least one of aluminum, gallium, and indium, and at least one of lithium and sodium. The optimum conditions for the luminous efficiency must be optimized during the production.

(2) Simple Process for Producing Composition

In a simple process for producing the intended zinc oxide phosphor of the present invention characterized in that the maximum intensity of the emission spectrum is observed in a wavelength range of 550 nm to 650 nm, and the spectrum is a continuous spectrum extending to 400 nm or less at the short-wavelength tail and to 800 nm or more at the long-wavelength tail, the zinc oxide-based composition is produced, the composition containing zinc oxide as a main component and a total of two or more sub-components including at least one alkali metal element for forming an acceptor level and at least one III group element for forming a donor level.

A process for producing the composition includes heat-treating zinc oxide containing a total of two or more additives including at least one of inorganic salts or oxides of aluminum, gallium, and indium and at least one of inorganic salts or oxides of lithium and sodium at a high temperature sufficient to solid-dissolve the additives in a zinc oxide crystal.

As a raw material for an alkali metal, an oxide ($Li_2O$ or $Na_2O$), a carbonate ($Li_2CO_3$ or $Na_2CO_3$), a nitrate ($Li_2NO_3$ or $Na_2NO_3$), a hydroxide (LiOH or NaOH), a metal (Li or Na), or the like can be used. However, it is convenient to use a carbonate compound because accurate weighing and safe handling generally become difficult due to hygroscopicity and reactivity.

As a raw material for a III group element, an oxide ($Al_2O_3$, $Ga_2O_3$, $In_2O_3$, or the like) can be easily used. Although a fluoride can be basically used, fluorine produced by decomposition may remain as a sub-component in the zinc oxide-based composition after the heat treatment, and thus an oxide is desirably used as a raw material for a solid III group element. Furthermore, according to the reactivity of the added raw materials, the heat treatment must be performed at a temperature sufficient for reaction between the added raw materials, such as $Li_2CO_3$ and $Al_2O_3$, and the main component, zinc oxide, to form the donor level and acceptor level, which contribute to luminescence, in the zinc oxide-based composition.

For example, when general commercial powder reagents of $Li_2O_3$ and $Al_2O_3$ are added to a general commercial powder reagent of zinc oxide, particularly, the resultant mixture is preferably heat-treated by a heat treatment apparatus with an unrestricted heating mechanism in a temperature range of 800° C. to 1100° C. for 3 to 12 hours. However, the heat treatment conditions depend on the powder particle sizes of the added raw materials and the zinc oxide raw material used as the main component. Therefore, during production, the heat treatment temperature and heat treatment time must be controlled according to the shapes of the raw materials used.

The heat treatment atmosphere is not particularly limited, but the heat treatment is preferably performed in an oxygen atmosphere, except a case in which a luminescent material showing low electric resistance is targeted. In particular, an alkali metal element has a high vapor pressure and is easily lost by evaporation at an elevated temperature. Therefore, the heat treatment may be performed by a method including pre-heating to start reaction at a temperature at which the additives react with zinc oxide as the main component, and an alkali metal is not significantly evaporated, and subsequent heat treatment at a higher temperature.

The pre-heating depends on the types of the raw materials used. When a raw material having a high decomposition temperature must be used, the pre-heating must be carried out at a higher temperature. For example, when gallium oxide and lithium oxide are used, the pre-heating temperature is preferably from 800° C. to 1000° C.

When the heat treatment is performed at an excessively high temperature or an excessively low oxygen partial pressure, zinc oxide used as the main component and an alkali metal element and a III group element used as sub-components may be significantly evaporated, thereby failing to impart desired characteristics to a luminescent material containing the zinc oxide-based composition according to the present invention. Therefore, the heat treatment temperature and atmosphere are preferably determined so that the heat treatment is performed under conditions in which the composition is not significantly changed by the evaporation. However, the above-described process is only an example of the simple process, and whether or not this process is carried out is not necessarily a requirement of the present.

Another simple production process includes adding, to a zinc oxide powder, a solution (LiCl or NaCl aqueous solution or a LiCl or NaCl solution diluted with an alcohol) containing at least one alkali metal element for forming an acceptor level in zinc oxide and a solution ($Al(NO_3)_3$ aqueous solution or a $Al(NO_3)_3$ solution diluted with an alcohol) containing at least one III group element for forming a donor level in zinc oxide; drying and mixing or kneading and drying the resultant mixture; and then heat-treating the mixture to effect reaction.

In the step of kneading and drying or drying and mixing, kneading and drying or drying and mixing may be carried out in any desired order, but the order may be appropriately changed according to the amounts of the solutions added, without producing a considerable influence on the whole of the production process. For example, drying and mixing can be simultaneously performed. The drying conditions including the drying temperature and atmosphere are not particularly limited as long as a volatile component (water or the like) is evaporated so as not to inhibit reaction and recovery of the product in the heat treatment after drying. Namely, the characteristics of the product are not significantly changed as long as the mixing method is capable of achieving satisfactory mixing of the main component and the alkali metal and III group element.

The heat treatment must be performed at a temperature sufficient for reaction between the sub-components such as lithium and aluminum and the main component, zinc oxide, to form the donor level and acceptor level, which contribute to luminescence, in the zinc oxide-based composition. For example, when an aqueous lithium chloride solution and aluminum nitrate are added to a general commercial powder reagent of zinc oxide, the heat treatment is preferably performed by a heat treatment apparatus with an unrestricted heating mechanism in a temperature range from 800° C. to 1100° C. for 3 to 12 hours.

However, the heat treatment conditions depend on the powder particle sizes of the added raw materials and the zinc oxide raw material used as the main component. Therefore, during production, the heat treatment temperature and heat treatment time must be controlled according to the shapes of the raw materials used. The heat treatment atmosphere is not particularly limited, but the heat treatment is preferably performed in an oxygen atmosphere, except a case in which a luminescent material showing low electric resistance is targeted. In particular, an alkali metal element has a high vapor pressure and is easily lost by evaporation at an elevated temperature. Therefore, the heat treatment may be performed by a method including pre-heating to start reaction at a temperature at which the additives react with zinc oxide used as the main component, and an alkali metal is not significantly evaporated, and subsequent heat treatment at a higher temperature.

When the heat treatment is performed at an excessively high temperature or an excessively low oxygen partial pressure, zinc oxide used as the main component and an alkali metal element and a III group element used as sub-components may be significantly evaporated, thereby failing to impart desired characteristics to a luminescent material containing the zinc oxide-based composition according to the present invention. Therefore, the heat treatment temperature and atmosphere are preferably determined so that the heat treatment is performed under conditions in which the composition is not significantly changed due to the evaporation. However, the above-described process is only an example of the simple process, and whether or not this process is carried out is not necessarily a requirement of the present.

In the heat treatment for reacting the mixture to form donors and acceptors in the zinc oxide-based composition, which is performed in the above-mentioned production process, the luminous efficiency of the product may be improved by reacting the mixture in an oxygen gas. The oxygen partial pressure must be controlled according to the required characteristics (herein, luminous efficiency and electric resistivity) of the product. Since the electric resistance increases as the oxygen partial pressure increases, the oxygen partial pressure must be controlled to obtain the product having characteristics closest to the desired characteristics. However, production in the oxygen atmosphere is not necessarily a requirement in the present invention.

During the production, the luminous efficiency may be improved by heat-treating the composition in an atmosphere containing oxygen as a main component. Therefore, in some cases, in order to improve the luminous efficiency, it is effective to anneal the composition in a gas containing oxygen as a main component in a final step of the process for producing the composition.

The annealing is performed after the above-mentioned production process, for controlling the characteristics of the zinc oxide-based composition in which the donor level and acceptor level have been formed by adding at least two additives as the sub-components to zinc oxide used as the main component, the additives including at least one of the III group elements, aluminum, gallium, and indium, and at least one of lithium and sodium. The annealing is not necessarily performed.

The annealing is performed for changing the amount and state of defects and is thus preferably performed at a most effective temperature between 400° C. and 1100° C. Namely, the concentrations and states of defect species such as oxygen defects in zinc oxide are influenced by both the temperature and oxygen partial pressure, and thus the temperature and atmosphere must be controlled to achieve desired characteristics (herein, luminous efficiency and electric conductivity) or characteristics close to the desired ones. The amount of oxygen defects generally tends to decrease at a low temperature and a high oxygen partial pressure, but the diffusion coefficient of ions in a solid decreases as the temperature decreases, and thus a long-term treatment is required.

Furthermore, the sufficient annealing time naturally depends on the dimensions of the resulting zinc oxide-based composition. For example, if the product has a pellet shape having a diameter of 10 mm and a thickness of 2 mm, the annealing conditions suitable for achieving the effect within a finite time are conditions in which heating is performed at a temperature of 800° C. to 1100° C. for 1 to 10 hours in a heat treatment apparatus charged with oxygen at 1 atm, and then the temperature is decreased to room temperature in the same atmosphere within 3 to 6 hours. The treatment conditions must be investigated according to the shape and density of the product to determine optimum conditions. However, the annealing in the oxygen atmosphere is not an essential requirement of the present invention.

Furthermore, when a powder is compacted at a pressure at which a compact is hardly broken, the material is made easy to handle. In this case, weighting is not so essential for the characteristics of the material, and the effect of suppressing the evaporation of the material to be treated, such as sodium or lithium, is expected from compacting. On the other hand, when the compact is baked, much time is required for grinding the compact to a powder to be used. Therefore, pressure forming of a powder is not an essential requirement of the present invention.

The composition prepared by any one of the above-described processes for producing the zinc oxide phosphor may be hydrogenated to improve the luminous efficiency. Therefore, in order to improve the luminous efficiency, it may be effective to hydrogenate the whole of the phosphor or the surface thereof in the final step of the production process for the composition. Herein, hydrogenation is performed after the above-descried production process, for controlling the characteristics of the zinc oxide-based composition in which the donor and acceptor levels have been formed by adding at least two additives as the sub-components to zinc oxide as the main component, the additives including at least one of the III group elements, such as aluminum, gallium, and indium, and at least one of lithium and sodium. The hydrogenation is not necessarily performed.

The most typical hydrogenation method is a method using plasma. A method for hydrogenating the phosphor by heat treatment under a hydrogen gas stream can be also used. However, when zinc oxide is heated in a reducing atmosphere containing hydrogen, evaporation of zinc oxide or the defect concentration in zinc oxide may be increased, and the luminous efficiency of the intended zinc oxide phosphor of the present invention may be degraded depending on the degree of reduction. By using plasma capable of producing atomic hydrogen, hydrogenation becomes possible due to the high reactivity of the atomic hydrogen without causing the significant evaporation and reduction of the phosphor.

When the zinc oxide phosphor is hydrogenated, it is important that the hydrogen amount is not excessive. When hydrogen is excessively introduced, a broad emission spectrum of yellowish-white light which is the purpose of the present invention may be impaired. In other words, in the present invention, hydrogenation is performed for changing a defect state which decreases the intended high luminous efficiency without changing the states of the additives for creating the intended luminescence, thereby suppressing non-radiative transition. Also, the concentration of defects which contribute to non-radiative transition may be decreased depending on the production conditions for the phosphor. In this case, the luminous efficiency is not improved even by hydrogenation. Namely, in the present invention, the hydrogenation is not necessarily required for improving the function of the phosphor and should be performed according to demands.

As a method for hydrogenating the zinc oxide phosphor by irradiation of hydrogen-containing plasma, there are several methods including a method using high-pressure plasma generated at a relatively high pressure and a method using low-pressure plasma generated at a high degree of vacuum. Either of the methods must be performed after the treatment conditions are optimized according to the plasma generation method used. In optimizing the treatment conditions, for example, the electric power applied for generating plasma or the distance between a plasma flame and the phosphor to be treated is changed to produce several types of hydrogenated phosphors, and the emission spectra thereof are evaluated. The hydrogenation conditions are determined to obtain an emission spectrum closest to the intended spectrum under predetermined excitation conditions, and thereby the optimum conditions can be obtained.

(3) Light Emitting Device

A light emitting device using the zinc oxide phosphor of the present invention is characterized in that the zinc oxide phosphor is irradiated with electromagnetic waves at a wavelength of 375 nm or less to excite luminescence. Namely, the light emitting device utilizes the luminescence of the phosphor.

Figure 1:
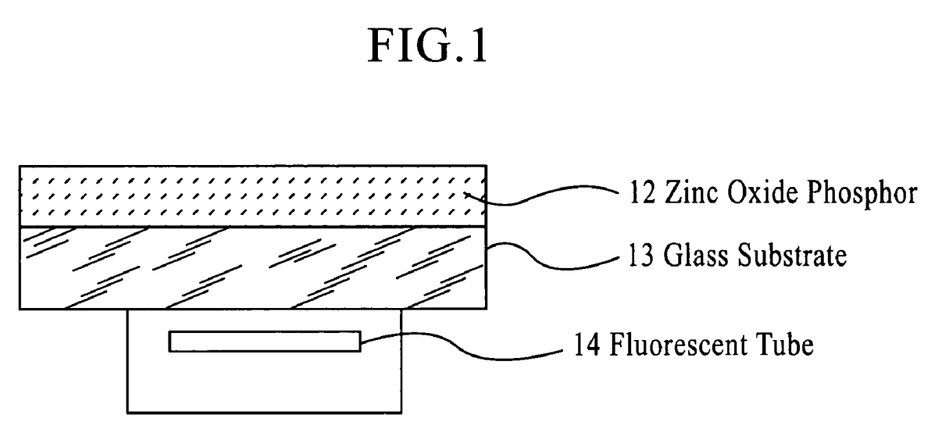
FIG. 1 is a schematic view of a light emitting device using ultraviolet excitation according to the present invention.

In other words, in the light emitting device, the phosphor is excited with sufficient strength using a general ultraviolet light source as an excitation source to emit light. Examples of the ultraviolet light source include a discharge tube and a solid-state ultraviolet light emitting element. The phosphor is applied on the inner surface of the discharge tube so that ultraviolet rays emitted by discharge can be used as a light source. FIG. 1 is a schematic view showing the light emitting device. In the light emitting device shown in FIG. 1, a general fluorescent tube (14) is disposed at the back of a glass substrate (13) on which a zinc oxide phosphor (12) of the present invention is applied. The light emitting device can be used in an application in which a stimulus is applied to the human vision and an exposure apparatus in which an optical stimulus is applied to a photoresponsive object.

Herein, a point to notice is that when the excitation intensity exceeds a range suitable for the phosphor, the phosphor may cause band edge luminescence, i.e., ultraviolet luminescence, and thus the excitation intensity must be controlled according to the luminous efficiency of the phosphor. This applies to a light emitting device in which the fluorescent tube used as the ultraviolet light source in the light emitting device shown in FIG. 1 is replaced by a pulse ultraviolet light source including a combination of a Q-switched Nd:YVO pulse laser and a nonlinear optical crystal generating a 4-times higher harmonic wave. The pulse light source including the Q-switched Nd:YVO has a power density of 100 times or more as high as that of the ultraviolet light source using the fluorescent tube. In the light emitting device using the high-output pulse laser as an excitation source, of the energy applied for excitation, the energy consumed for increasing the ultraviolet luminescence intensity is increased to fail to increase the visible luminescence intensity correspondingly to an increase in the input energy. Therefore, high-efficiency visible luminescence may be not necessarily obtained.

In the light emitting device using the zinc oxide phosphor of the present invention, the zinc oxide phosphor may be irradiated with electron rays to excite the luminescence of the phosphor.

Namely, thermoelectrons or electrons emitted from any one of various electron ray sources, such as a field emitter, are accelerated to irradiate the phosphor. As a result, the phosphor is irradiated with electrons having energy sufficient to form electron-hole pairs in the phosphor, thereby emitting light.

A mechanism for generating electron rays is not particularly limited, and thermoelectrons or electron rays emitted by field radiation can be generally used. Namely, the light emitting device of the present invention includes (1) a mechanism for emitting electron rays sufficient to obtain appropriate irradiation intensity, (2) a mechanism for applying kinetic energy sufficient for electrons to produce electron-hole pairs in the zinc oxide phosphor, (3) an electrode (ground electrode) for emitting charge for avoiding a charge-up state due to charge accumulation in the phosphor when the phosphor is irradiated with electron rays, and (4) a light exit port made of a light-transmitting material capable of illuminating a target portion with the emitted fluorescent light. In particular, when an electron ray generator of a system in which electron rays are generated by an electric field is provided, a common mechanism can be used as an electron generating mechanism and a mechanism for accelerating electron rays.

Figure 2:
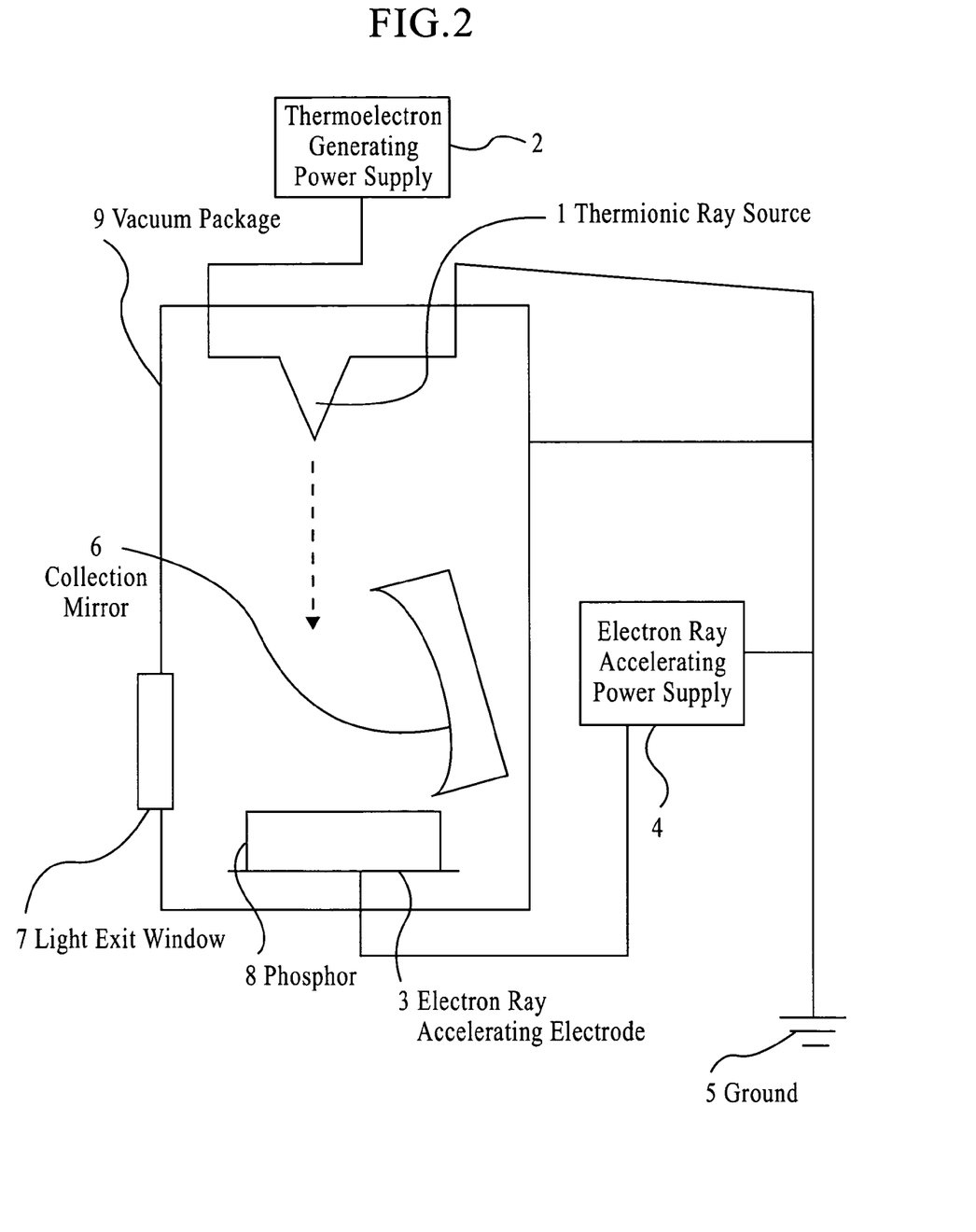
FIG. 2 is a schematic view of a light emitting device using electron ray excitation according to the present invention.

Herein, a point to notice is that when the excitation intensity exceeds a range suitable for the phosphor, the phosphor may produce band edge luminescence, i.e., ultraviolet luminescence, and thus the excitation intensity must be controlled according to the luminous efficiency of the phosphor. This applies to the light emitting device shown in FIG. 2. As shown in FIG. 2, a body of the light emitting device includes a thermionic ray source (1), an electron ray accelerating electrode (3), a ground (5), a collection mirror (6), a light exit window (7), and a phosphor (8), which are installed in a vacuum package (9). The body is connected to an thermoelectron generating power supply (2) and an electron ray accelerating power supply (4) which are connected to the thermionic ray source (1) and the electron ray accelerating electrode (3), respectively. The phosphor (8) is irradiated with electron beams emitted from the thermionic ray source (1) to emit light, and the emitted light is taken out through the light exit window 7. This device configuration is only an example of the configuration of a light emitting device, and the collection mirror (6) is not an essential component. When the vacuum package (9) is made transparent, the light exit window (7) may be made unnecessary. Namely, the device is basically capable of radiating electron rays. The light emitting device can be used in an application in which a stimulus is given to the human vision and an exposure apparatus in which an optical stimulus is given to a photoresponsive object.

Alternatively, a light emitting device using the zinc oxide phosphor of the present invention is characterized in that the phosphor is excited using ultraviolet rays or electron rays to emit light, and broad light emitted by exciting the zinc oxide phosphor with electron rays or ultraviolet rays is passed through a color filter so that light only in a specified wavelength range can be taken out from the device and utilized.

Figure 3:
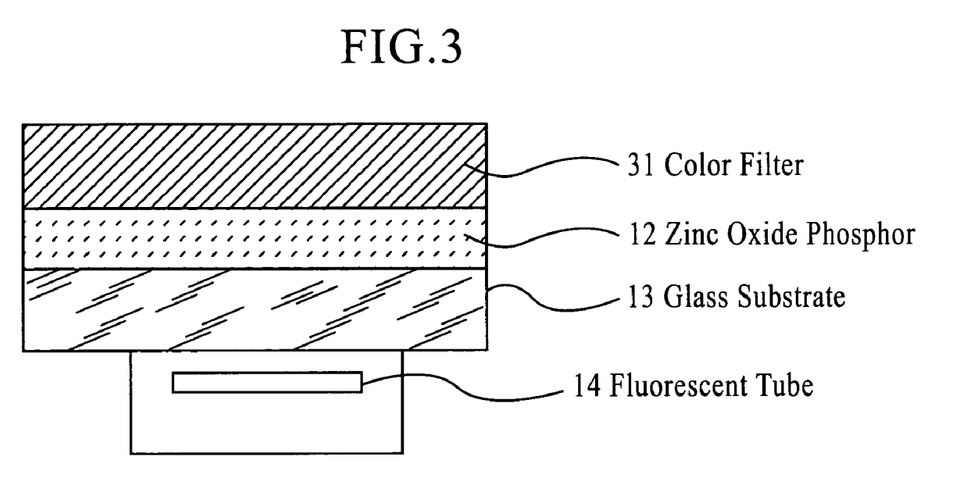
FIG. 3 is a schematic view of a light emitting device using ultraviolet excitation according to the present invention in which a color filter is provided.
Figure 4:
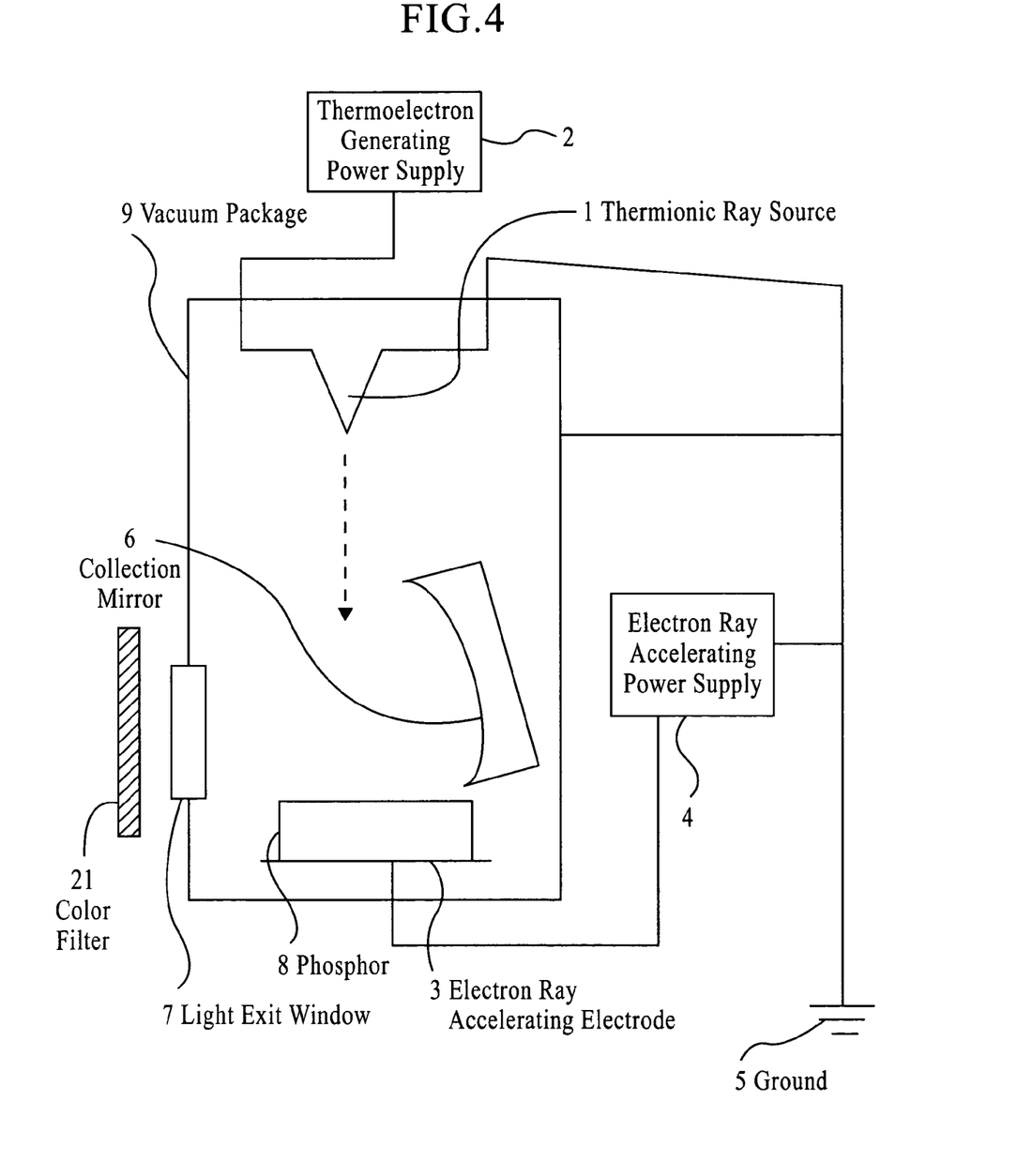
FIG. 4 is a schematic view of a light emitting device using electron ray excitation according to the present invention in which a color filter is provided.

FIG. 3 is a schematic view showing another example of the light emitting device. The light emitting device of this example is characterized in that the light emitting device shown in FIG. 1 is provided with a general color filter (31) which absorbs light at a wavelength shorter than 600 nm, thereby emitting reddish orange light. This light emitting device can be used in an application in which a stimulus is given to human vision and an exposure apparatus in which an optical stimulus is given to a photoresponsive object. FIG. 4 is a schematic view showing a further example of the light emitting device. The light emitting device of this example is characterized in that a color filter (21) which absorbs light at a wavelength shorter than 600 nm is provided on the light emitting device shown in FIG. 2, thereby emitting reddish orange light.

EXAMPLE

Example 1

A gallium oxide powder and a lithium carbonate powder were mixed with a general commercial powder reagent of 99.999% purity zinc oxide so that the atomic ratios of gallium and lithium to zinc were 1/1000 and 1/10000, respectively. Then, the resulting mixed powder was placed in an alumina porcelain, set in an electric furnace which was a general heating device, and then reacted at 800° C. for 3 hours in an oxygen atmosphere supplied from a commercial oxygen gas cylinder. As a result, the lithium carbonate used as a lithium source was particularly decomposed to release carbon dioxide gas by vaporization. In this step, the amount of the lithium added was decreased so as not to increase resistance.

Then, a load of 1 ton was applied to the resulting reaction product to form a pellet having a diameter of 10 mm and a thickness of 3 mm. The pellet was again placed in an alumina porcelain, set in an electric furnace which was a general heating device, and then baked at 1100° C. in an oxygen atmosphere, thereby obtaining a zinc oxide-based composition in which gallium and lithium was solid-dissolved.

The zinc oxide-based composition prepared by the above-described method was irradiated with light at a wavelength of about 355 nm or about 245 nm, and the light emitted from the composition was visually observed. As a result, yellowish emitted light was observed, and thus production of the target phosphor was confirmed. Similarly, a conventional zinc oxide phosphor having a composition containing an excess of zinc was observed. As a result, blue-green emitted light was visually observed.

Also, these zinc oxide-based compositions were irradiated with electron rays accelerated to 5 KeV, and the light emitted by excitation was dispersed by a general commercial spectroscope and detected by a CCD detector which was a general commercial photodetector to record an emission spectrum. As a result, the spectrum shown in FIG. 5 was obtained. The emission spectrum of the conventional product has a peak at 2.3 eV (wavelength of about 540 nm) as shown by a bold line. However, the zinc oxide-based composition of the present invention containing an alkali metal element for forming an acceptor level and a III group element for forming a donor level shows a spectrum thereof having a peak at about 2.0 eV (wavelength of about 600 nm) as shown by a thin line.

Figure 5:
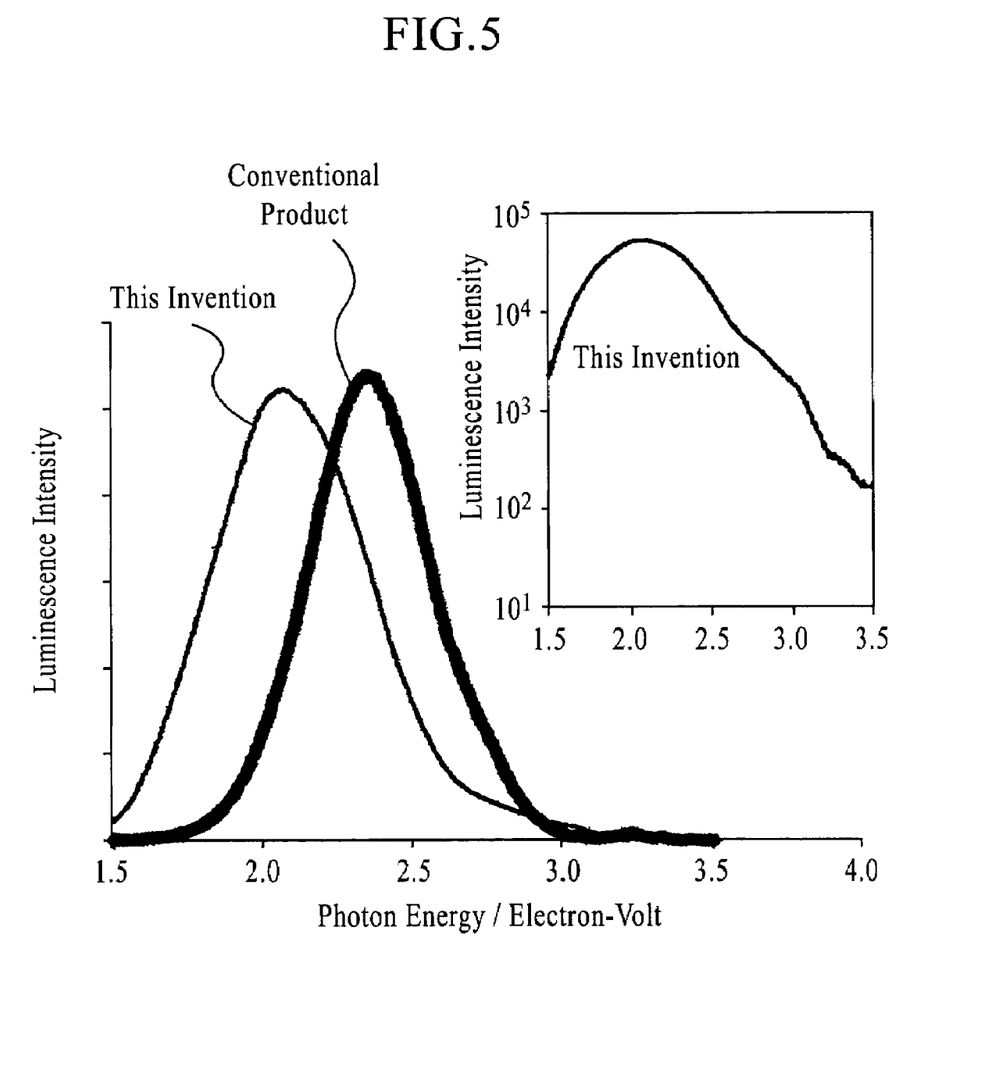
FIG. 5 shows the emission spectra observed using electron ray excitation from a zinc oxide phosphor produced in Example 1 of the present invention and a zinc oxide phosphor of a comparative example.

In a figure inserted in FIG. 5, the emission spectrum of the phosphor of the present invention is rewritten by using a log scale on the ordinate. As seen from this figure, an extremely broad emission spectrum is obtained. The two spectra resulted under same measurement conditions using the same spectroscope and photodetector, and thus resulted under experimental conditions capable of at least intercomparison therebetween.

In comparison to the spectrum of the conventional product of the zinc oxide phosphor emitting blue-green light, the zinc oxide-based composition containing donors and acceptors, which were simultaneously added, shows a broader visible emission spectrum which is close to white light. The emission spectrum is a continuous spectrum in which the intensity peak at room temperature is observed in a wavelength range of 550 nm to 650 nm, the short-wavelength tail extends to 400 nm or less, and the high-wavelength tail extends to 800 nm or more. If the error of the measuring apparatus is taken into consideration, the emitted light is a yellowish color corresponding to a range in which x=0.40 to 0.47 and y=0.44 to 0.47 in the CIE1964 color specification system. Namely, the target phosphor is produced.

Example 2

Figure 6:
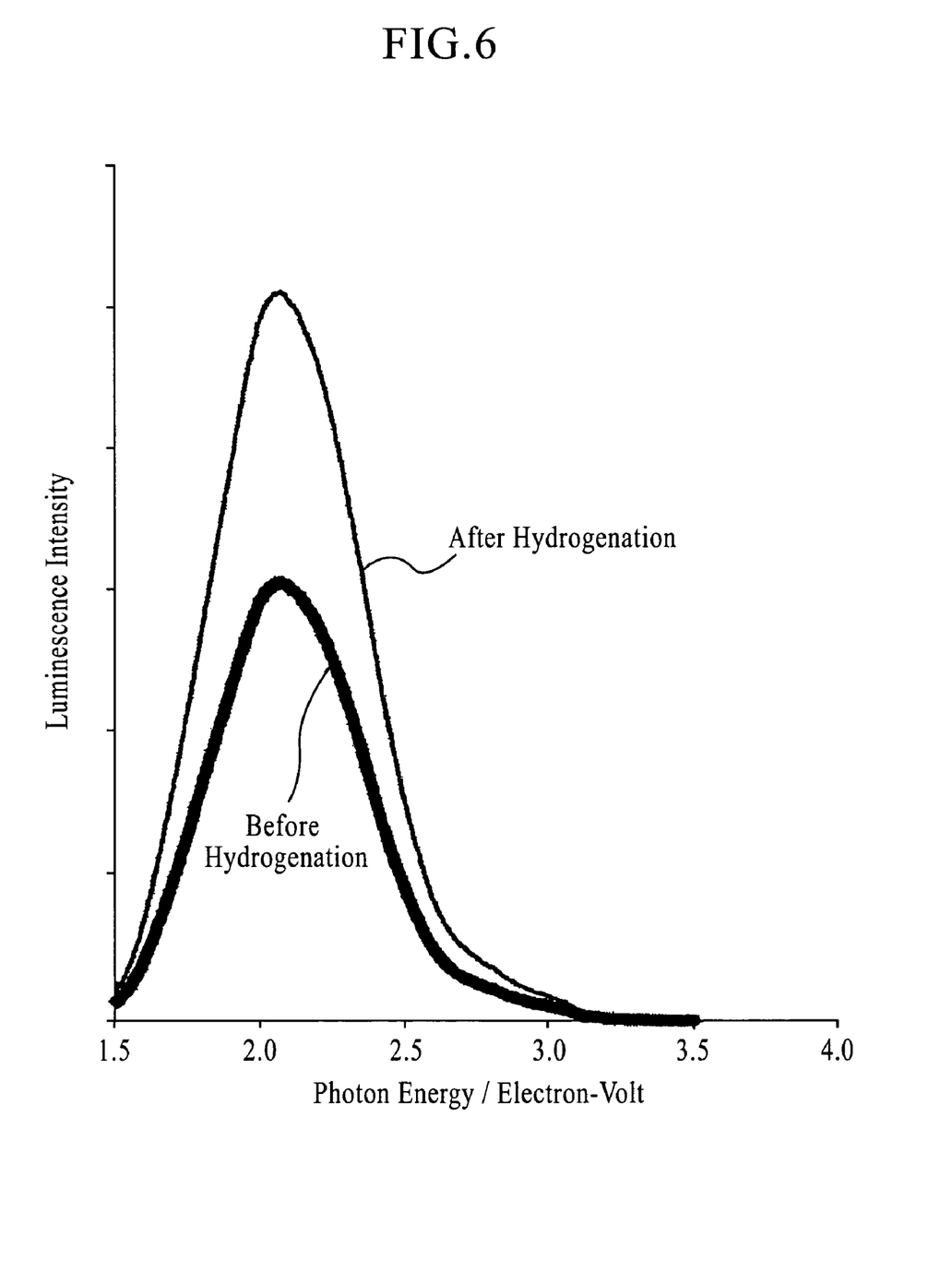
FIG. 6 shows the emission spectra observed using electron ray excitation from a zinc oxide phosphor produced in Example 1 and a zinc oxide phosphor produced in Example 2 in which the phosphor of Example 1 was hydrogenated according to the present invention.

The zinc oxide phosphor prepared in EXAMPLE 1 was irradiated with plasma produced by a plasma generator as described in the above-described Patent Publication No. 2920207, i.e., inductively coupled plasma produced by applying radio-waves to a mixed gas of hydrogen gas and Ar gas, to produce a zinc oxide phosphor doped with hydrogen. The zinc oxide phosphor treated in this example had a pellet form having a diameter of about 8 mm and a thickness of about 2 mm, and the plasma irradiation time was 5 minutes. The phosphor doped with hydrogen by the plasma treatment was excited with electron rays by the same method as in EXAMPLE 1, and the emission spectrum thereof was observed. The results are shown in FIG. 6. In FIG. 6, the spectrum of the phosphor before hydrogenation has a pattern shown by a bold line, and the spectrum after hydrogenation has a pattern shown by a thin line. As seen from FIG. 6, the luminous efficiency of the zinc oxide phosphor is improved by hydrogenation treatment with hydrogen plasma.

Example 3

Figure 7:
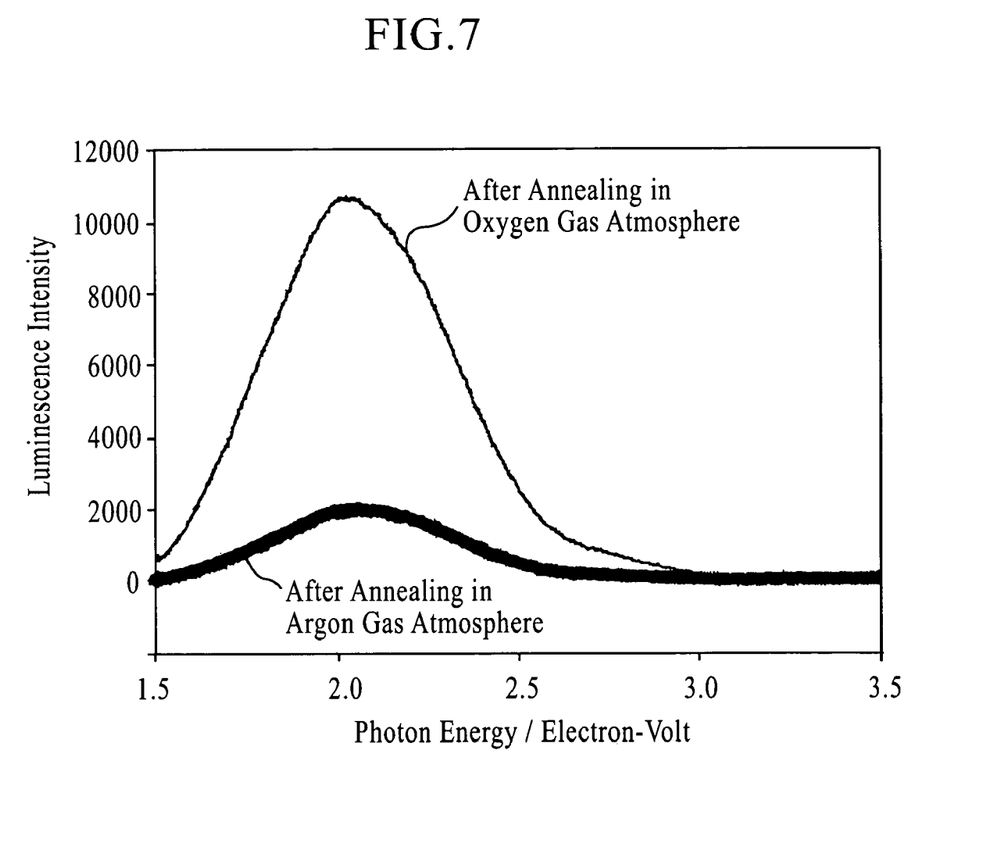
FIG. 7 shows the emission spectra observed using electron ray excitation from a zinc oxide phosphor produced in Example 1 and a zinc oxide phosphor produced in Example 3 according to the present invention.

The zinc oxide phosphor prepared in EXAMPLE 1 was annealed at 1100° C. for 6 hours in an oxygen atmosphere. FIG. 7 shows an emission spectrum (sunlight) of the phosphor before annealing and an emission spectrum (thin line) of the annealed product under irradiation with electron rays accelerated to 5 KeV.

The two spectra were obtained using the same apparatus under the same measurement conditions, thereby permitting intercomparison therebetween. The spectrum of the phosphor annealed in oxygen gas has higher intensity. Namely, the phosphor with higher luminous efficiency is produced by annealing in oxygen. However, even when the annealed phosphor was further annealed in oxygen for 6 hours, a significant improvement in luminous efficiency was not observed. In other words, annealing has the function to recover the luminous efficiency of a phosphor in which a decrease in luminous efficiency is observed for some reason, and annealing of a phosphor initially having high luminous efficiency exhibits only a limited effect.

Example 4

The phosphor (8) prepared in EXAMPLE 1 was irradiated with electron beams of about 1 nA emitted from the thermionic ray source (1) in the light emitting device shown in FIG. 2, and the emitted light was taken out through the light exit window 7 and observed. As a result, the emitted light was yellowish color close to white.

INDUSTRIAL APPLICABILITY

A zinc oxide phosphor according to the present invention is used for a light emitting device in which the phosphor is excited by ultraviolet rays or electromagnetic waves or electron rays at a wavelength shorter than that of ultraviolet rays. The phosphor can be used in an application in which a stimulus is applied to human vision, and an exposure apparatus such as a printing light source or a photograph reader light source, in which an optical stimulus is applied to a photoresponsive object, and can also be used as a fluorescent paint.

The invention claimed is:

1. A zinc oxide phosphor comprising:
   zinc oxide;
   at least one of aluminum, gallium, and indium doped to said zinc oxide; and
   at least one of lithium and sodium doped to said zinc oxide,
   wherein a surface layer containing solid-soluted hydrogen is formed at a hydrogen concentration controlled so as to inactivate defects formed in the phosphor to contribute to non-radiative transition and not to inactivate defects contributing to radiative transition, or hydrogen is contained at a concentration controlled so as to inactivate defects formed in the phosphor to contribute to non-radiative transition over the entire region of a grain of the phosphor and not to inactivate defects contributing to radiative transition, and
   wherein when the phosphor is excited with ultraviolet rays or electromagnetic waves or electron rays at a shorter wavelength than that of ultraviolet rays, the maximum intensity of an emission spectrum at room temperature is observed in a wavelength range of 550 to 650 nm, and the spectrum is a continuous spectrum extending from 400 nm or less at the short-wavelength tail and to 800 nm or more at the long-wavelength tail.

2. The zinc oxide phosphor according to claim 1, wherein the emitted light has a yellowish color corresponding to a range in which x=0.40 to 0.47 and y=0.44 to 0.47 in the CIE1964 color specification system.

3. A process for producing the zinc oxide phosphor according to claim 1, the process comprising heat-treating zinc oxide containing a total of two or more additives at a high temperature sufficient to solid-dissolve the additives in a crystal of the zinc oxide, the additives including at least one of inorganic salts or oxides of aluminum, gallium, and indium and at least one of inorganic salts and oxides of lithium and sodium.

4. The process according to claim 3, comprising annealing the zinc oxide in a gas containing oxygen as a main component in a final stage of production.

5. A process for producing the zinc oxide phosphor according to claim 1, the process comprising treating zinc oxide containing a total of two or more additives with hydrogen plasma to control the hydrogen content of a surface layer of a phosphor particle or over the entire phosphor particle, the additives including at least one of aluminum, gallium, and indium and at least one of lithium and sodium.

6. A light emitting device comprising the zinc oxide phosphor according to claim 1, wherein the zinc oxide phosphor is irradiated with electromagnetic waves at a wavelength of 375 nm or less to excite luminescence.

7. The light emitting device according to claim 6, comprising a color filter disposed at a light exit portion for emitting only the light emitted from the phosphor in the light emitting device and transmitted through the color filter.

8. An exposure apparatus comprising the light emitting device according to claim 6.

9. A light emitting device comprising the zinc oxide phosphor according to claim 1, wherein the zinc oxide phosphor is irradiated with electron rays to excite luminescence.

10. The light emitting device according to claim 9, comprising a color filter disposed at a light exit portion for emitting only the light emitted from the phosphor in the light emitting device and transmitted through the color filter.

11. An exposure apparatus comprising the light emitting device according to claim 9.

* * * * *